United States Patent

[11] 3,571,573

[72] Inventor Granville E. Ott
Houston, Tex.
[21] Appl. No. 606,066
[22] Filed Dec. 30, 1966
[45] Patented Mar. 23, 1971
[73] Assignee Texas Instruments Incorporated
Dallas, Tex.

[54] CLOCKING SYSTEM
2 Claims, 5 Drawing Figs.

[52] U.S. Cl. .......... 235/92
[51] Int. Cl. .......... G06m 3/02, H03k 21/08
[50] Field of Search .......... 235/92

[56] References Cited

UNITED STATES PATENTS

| | | | |
|---|---|---|---|
| 2,951,202 | 8/1960 | Gordon | 235/92 |
| 3,230,352 | 1/1966 | Grondin et al. | 235/92 |
| 3,420,990 | 1/1969 | Andrea et al. | 235/92 |
| 2,853,238 | 9/1958 | Johnson | 235/92 |
| 2,970,763 | 2/1961 | Freeman | 235/92 |

*Primary Examiner*—Maynard R. Wilbur
*Assistant Examiner*—Michael K. Wolensky
*Attorneys*—Harold Levine, James O. Dixon, Andrew M. Hassell, Samuel M. Mims, Jr., Rene'E. Grossman, Richards, Harris and Hubbard and V. Bryan Medlock, Jr.

ABSTRACT: A ring counter having a one count delay during each cycle is used to clock a Johnson counter during the one count delay. A number of individually identifiable clock pulses are then available for clocking and sequential control functions by ANDing any one of the outputs of the ring counter with any one of the outputs of the Johnson counter, the total number being equal to the product of the number of ring counter outputs and the number of Johnson counter outputs.

| CLOCK PULSE | $P_1$ | $P_2$ | $P_3$ | $P_4$ |
|---|---|---|---|---|
| $t_0$ | 0 | 0 | 0 | 0 |
| $t_1$ | 1 | 0 | 0 | 0 |
| $t_2$ | 0 | 1 | 0 | 0 |
| $t_3$ | 0 | 0 | 1 | 0 |
| $t_4$ | 0 | 0 | 0 | 1 |
| $t_5$ | 0 | 0 | 0 | 0 |
| $t_6$ | 1 | 0 | 0 | 0 |

| | $JC_1$ | $JC_2$ | $JC_3$ | $JC_4$ |
|---|---|---|---|---|
| $T_1$ | 0 | 0 | 0 | 0 |
| $T_2$ | 1 | 0 | 0 | 0 |
| $T_3$ | 1 | 1 | 0 | 0 |
| $T_4$ | 1 | 1 | 1 | 0 |
| $T_5$ | 1 | 1 | 1 | 1 |
| $T_6$ | 0 | 1 | 1 | 1 |
| $T_7$ | 0 | 0 | 1 | 1 |
| $T_8$ | 0 | 0 | 0 | 1 |

INVENTOR
GRANVILLE E. OTT

E. Mickey Hubbard
ATTORNEY

INVENTOR
GRANVILLE E. OTT

E. Mickey Hubbard
ATTORNEY

CLOCKING SYSTEM

BACKGROUND OF THE INVENTION

This invention relates generally to digital systems, and more particularly relates to a system for producing a number of individually identifiable clock pulses which occur in a predetermined sequence.

In digital logic systems such as, for example, computers, data processors and automated control systems, it is often necessary to utilize a sequence control having a number of individually identifiable pulses which occur in a predetermined sequence. Perhaps the most apparent solution to this problem is to provide a ring counter having the desired number of outputs, although a binary counter with a suitable binary-to-numerical decoder might also be used. However, these approaches require a relatively large number of circuit components and are not wholly satisfactory.

SUMMARY OF INVENTION CLAIMED

A fist counter having a plurality of outputs for sequentially producing a pulse on each output, then after a delay period, repeating the sequence, and a second counter having a plurality of outputs for sequentially producing a pulse on each output and then repeating the sequence, the second counter being clocked by the first counter during the delay period. More specifically, the first counter is preferably a ring counter including a delay stage, and the second counter is a Johnson counter which is clocked through a delay circuit by the last output from the ring counter preceding the delay period.

DESCRIPTION OF A PREFERRED EMBODIMENT

Figures 1, 2, 3:
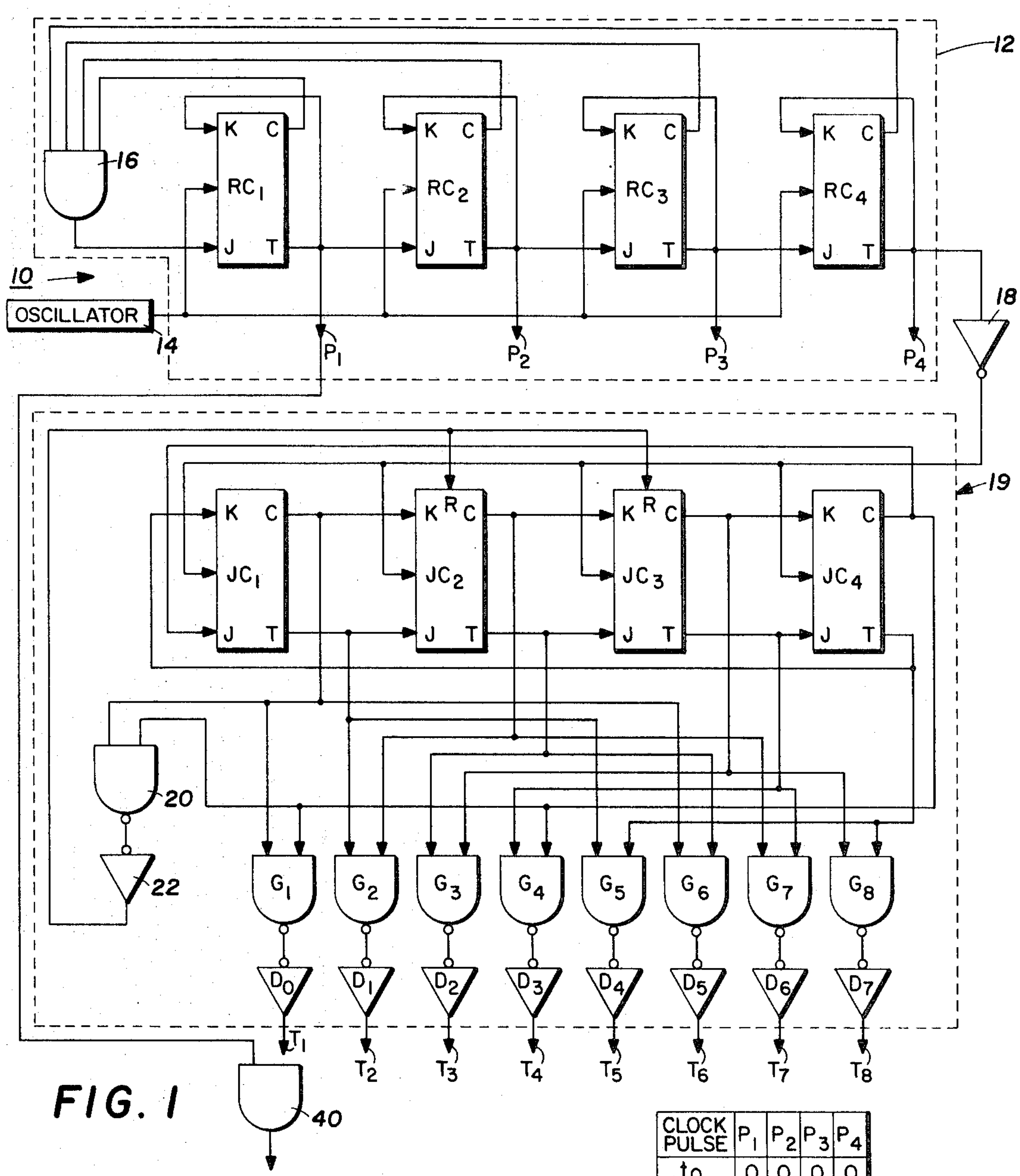
FIG. 1 is a schematic logic diagram of a clocking system in accordance with the present invention.
FIG. 2 is a logic diagram illustrating the operation of the ring counter of the clocking system of FIG. 1.
FIG. 3 is a logic table illustrating the operation of the Johnson counter of the clocking system of FIG. 1.

Referring now to the drawings, a clocking system in accordance with the present invention is indicated generally by the reference numeral 10 in FIG. 1. The clocking system 10 is comprised of a ring counter indicated generally by the reference numeral 12 having four binary stages $RC_1$, $RC_2$, $RC_3$ and $RC_4$. Each of the binary stages may comprise a conventional J—K flip-flop having J and K inputs and true and complement outputs T and C, respectively, as indicated. The J—K flip-flops assume a state after each clock pulse from an oscillator 14 that is dependent upon the state of the inputs prior to the clock pulse. If a logic 1 is applied to the J input and a logic 0 to the K input, the flip-flop will assume a logic 1 state with the true output T at a logic 1 level. If the J input is a logic 0 and the K input a logic 1, the flip-flop will assume a logic 0 state after the clock pulse with the true output a logic 0 level. The conditions when both J and K inputs are a logic 1 and when both J and K inputs are a logic 0 are not used.

The binary stages $RC_1$—$RC_4$ are connected with the true output T of stage $RC_1$ connected to the J input of stage $RC_2$, the true output T of stage $RC_2$ connected to the J input of stage $RC_3$, and the true output T of stage $RC_3$ connected to the J input of stage $RC_4$. The true output T of each of the stages $RC_1-RC_4$ is also connected back to the K input of the stage so that the stage will automatically be set back to the logic 0 state on the first clock pulse after going to a logic 1 state. The complement outputs C of all four stages $RC_1-RC_4$ are connected back to the inputs of an AND gate 16, and the output of AND gate 16 is connected to the J input of stage $RC_1$. The true output T of stages $RC_1-RC_4$ are connected to the outputs $P_1-P_4$, respectively, of the ring counter 12. The true output T of stage $RC_4$ is connected through an inverting amplifier 18 to the clock inputs of each of the four stages $JC_1$, $JC_2$, $JC_3$ and $JC_4$ of a Johnson counter indicated generally by the reference numeral 19. Johnson counters of the type disclosed herein are described in U.S. Patent No. 2,853,238 issued to R. R. Johnson on Sept. 23, 1958. Each of the stages $JC_1$—$JC_4$ may also comprise a conventional J—K flip-flop. The true and complement outputs of stage $JC_1$ are connected to the J and K inputs, respectively, of stage $JC_2$; the true and complement outputs of stage $JC_2$ are connected to the J and K inputs, respectively, of stage $JC_3$; and the true and complement outputs of stage $JC_3$ are connected to the J and K inputs, respectively, of stage $JC_4$. However, the true and complement outputs of stage $JC_4$ are connected to the K and J inputs, respectively, of stage $JC_1$. In addition, the complement outputs of stages $JC_1$ and $JC_4$ are connected to the inputs of a NAND gate 20 the output of which is connected through an inverting amplifier 22 to the reset inputs of stages $JC_2$ and $JC_3$. This is to prevent the counter from operating in the illegal mode.

The true and complement outputs of stages $JC_1$—$JC_4$ are connected to the inputs of a bank of NAND gates $G_1$—$G_8$. The output of each of the NAND gates is connected to inverting amplifiers $D_0$—$D_7$ having outputs $T_1$—$T_8$, respectively. The inputs to gate $G_1$ are taken from the complement outputs of stages $JC_1$ and $JC_4$. The inputs of gate $G_2$ are taken from the true output of stage $JC_1$ and the complement output of stage $JC_2$. The inputs of gate $G_3$ are taken from the true output of stage $JC_2$ and the complement output of stage $JC_3$. The inputs of gate $G_4$ are taken from the true output of stage $JC_3$ and the complement output of stage $JC_4$, the inputs of gate $G_5$ are taken from the true output of stage $JC_1$ and the true output of stage $JC_4$, the inputs of gate $G_6$ are taken from the complement output of stage $JC_1$ and the true output of stage $JC_2$, the inputs to gate $G_7$ are taken from the complement output of stage $JC_2$ and the true output of stage $JC_3$, and the inputs of gate $G_8$ are taken from the complement output of stage $JC_3$ and the true output of stage $JC_4$.

OPERATION

The operation of the ring counter 12 may best be understood by referring to FIG. 2. Assume that after a clock pulse $t_0$ from the oscillator 14, all of the stages $RC_1$—$RC_4$ are at a logic 0 state. The logic 1 levels of the complement outputs will then satisfy the inputs of the gate 16 so that a logic 1 level will be applied to the J input of stage $RC_1$. Then on the next clock pulse $t_1$, the true output, and therefore output $P_1$, will go to a logic 1 level. The complement output of stage $RC_1$ will go to a logic 0 level so that the output of AND gate 16 will go to a logic 0 level. The logic 1 level of the true output of stage $RC_1$ is applied back to the K input of stage $RC_1$ and to the J input of stage $RC_2$.

On clock pulse $t_2$, stage $RC_1$ will complement back to a logic 0 state as a result of the logic 1 level at the K input, and stage $RC_2$ will complement to a logic 1state as a result of the logic 1 level at the J input so that output $P_2$ goes to a logic 1 level. The complement output of stage $RC_2$ will go to a logic 0 level so that the output of gate 16 will remain at a logic 0 level. The logic 1 level of the true output of stage $RC_2$ is then applied to the K input of stage $RC_2$ and to the J input of stage $RC_3$. On clock pulse $t_3$, stage $RC_2$ complements back to a logic 0 state, and stage $RC_3$ complements to a logic 1 state, with output $P_3$ going to a logic 1 level. The logic 0 level at the complement output of stage $RC_3$ maintains the output of AND gate 16 at a logic 0 level. The logic 1 level of the true output of stage $RC_3$ is fed back to the K input of stage $RC_3$ and to the J input of stage $RC_4$. On clock pulse $t_4$, stage $RC_3$ complements back to a logic 0 state, and stage $RC_4$ complements to a logic 1 state, thus raising output $P_4$ to the logic 1 level. The complement output C of stage $RC_4$ goes to a logic 0 level to maintain the output of gate 16 at a logic 0 level. On clock pulse $t_5$, stage $RC_4$ goes to a logic 0 level. All four outputs $P_1$—$P_4$ are then at a logic 0 level. The complement outputs C of all four stages $RC_1-RC_4$ are at a logic 1 level, the output of AND gate 16 is therefore at a logic 1 level. Then on clock pulse $t_6$, stage $RC_1$ complements to a logic 1 state and the cycle is repeated.

Figure 4:
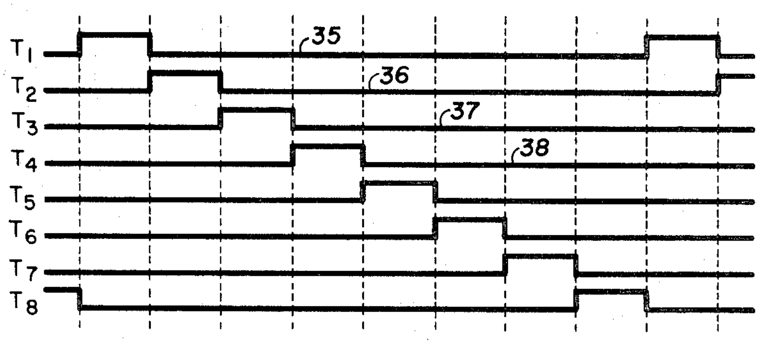
FIG. 4 is a timing diagram illustrating the state of the outputs $T_1$—$T_8$ of the Johnson counter during each cycle.

The inverting amplifier 18 produces a clock pulse for the Johnson counter 19 only in response to each negative going transition of the true output T of stage $RC_4$ of the ring counter 12. When first set in operation, the Johnson counter can assume an illegal mode of operation. However, in the illegal mode, stages $JC_1$ and $JC_4$ do assume a logic 0 state at the same time. At this time, stages $JC_2$ and $JC_3$ are immediately reset to the logic 0 state before the next clock pulse, at which time all four stages will be in the logic 0 state. Then on the next four successive clock pulses, stages $JC_1$, $JC_2$, $JC_3$ and $JC_4$ complement to the logic 1 state, and then on the following four clock pulses, stages $JC_1$, $JC_2$, $JC_3$ and $JC_4$ successively complement back to the logic 0 state. The cycle is then repeated. As a result of the connections of the true and complement outputs of the binary stages $JC_1$—$JC_4$ to the inputs of gates $G_1$—$G_8$, outputs $T_1$—$T_8$ go to a logic 1 level when the true outputs of the stages $JC_1$—$JC_4$ are at the logic levels indicated in the truth table of FIG. 3. Thus, the outputs $T_1$—$T_8$ successively go to a logic 1 in the sequence illustrated in the timing diagram of FIG. 4, the clock pulses from inverter 18 being represented by dotted lines $X_1$—$X_{10}$.

Figure 5:
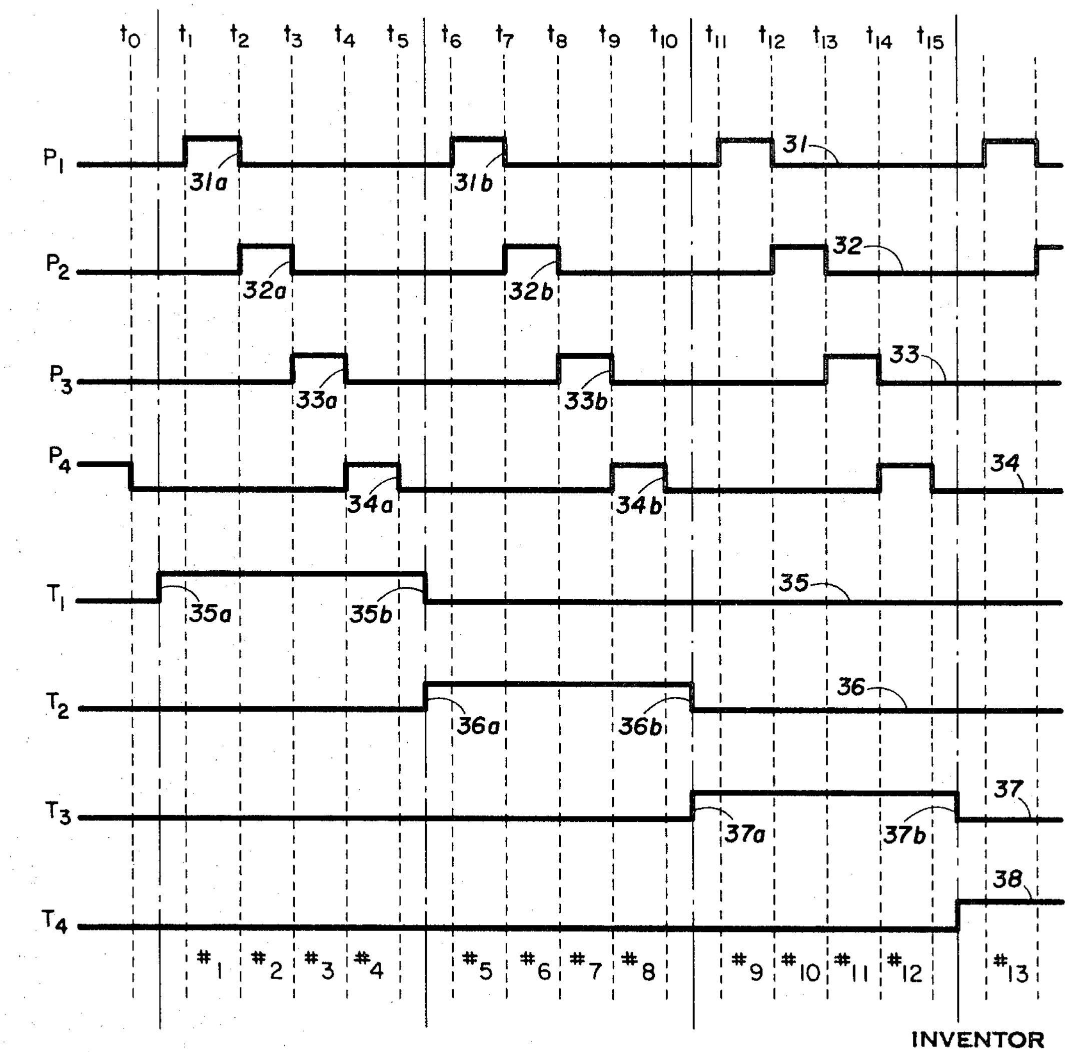
FIG. 5 is a timing diagram illustrating the operation of the clocking system of FIG. 1.

The coincidence between the operation of the ring counter 12 and the Johnson counter 19 is illustrated in the timing diagram of FIG. 5. The logic levels of the four outputs $P_1$—$P_4$ of the ring counter 12 are indicated by the time lines 31—34. Similarly, the logic levels of the eight outputs $T_1$—$T_8$ are represented by the time lines 35—38. Assume that prior to time $t_0$ the stages $RC_1$—$RC_3$ are in the logic 0 state and stage $RC_4$ is in the logic 1 state so that output $P_4$ of the ring counter 12 will be at a logic 1 level as represented by pulse 34*a*. Assume also that stages $JC_1$—$JC_3$ are in the logic 0 state and that stage $JC_4$ is in the logic 1 state so that only output $T_8$ is at a logic 1 level. Then on clock pulse $t_0$, $P_4$ will go to a logic 0 and all outputs $P_1$—$P_4$ of the ring counter will be at a logic 0 level. As the output $P_4$ goes to a logic 0 level, inverter 18 emits clock pulse $X_1$ which complements stage $JC_4$ to a logic 0 state so that output $T_1$ will go to a logic 1 level as illustrated at 35*a*. However, some propagation delay results before the negative going transition of the true output of stage $RC_4$ of the ring counter appears as a positive going transition at output $T_1$ of the Johnson counter. This is represented for simplicity as a delay occurring in inverter 18, which indeed does produce some delay, but also occurs in the Johnson counter. The total delay may be approximately one-half the period of oscillator 14. Thus, output $T_1$ goes positive after the occurrence of clock pulse $t_0$, but before the occurrence of clock pulse $t_1$. Then upon the occurrence of clock pulses $t_1$, $t_2$, $t_3$ and $t_4$, the outputs $P_1$—$P_4$ successively go to the logic 1 level as indicated by pulses 31*a*, 32*a*, 33*a* and 34*a*, respectively. Then after the fifth clock pulse, the negative going portion of pulse 34*a* produces a clock pulse $X_2$ at the output of inverter 18. Clock pulse $X_2$ increments the Johnson counter 19 so that output $T_1$ goes to a logic 0 level at 35*b* and output $T_2$ goes to a logic 1 level at 36*a* prior to the occurrence of clock pulse $t_6$, and during this interval all of the outputs $P_1$—$P_4$ are at a logic 0 level. Then outputs $P_1$—$P_4$ again successively rise to a logic 1 level on clock pulses $t_6$—$t_9$ as represented by the pulses 31*b*, 32*b*, 33*b* and 34*b*. Then as the output $P_4$ goes to a logic 0 level at the end of pulse 34*c*, another clock pulse $X_3$ is generated by inverter 18 which increments the Johnson counter 19, causing output $T_3$ to go to a logic 0 level as represented at 37*a*. This cycle is repeated for each of the eight outputs $T_1$—$T_8$.

Any one of the outputs $P_1$—$P_4$ can be ANDed with any one of the outputs $T_1$—$T_8$, as represented by AND gate 40 in FIG. 1. The AND gate 40 will then produce a logic 1 output only during period 01 between clock pulse $t_1$ and clock pulse $t_2$. Thus, four distinct pulse periods occur during each of the eight counts of the Johnson counter 19, giving a total of 32 sequential counts which can be individually identified. For example, periods 01—04 (see the bottom of FIG. 5) are defined by a logic 1 level at output $T_1$ and outputs $P_1$—$P_4$, respectively. Periods 05—08 are defined during the period when output $T_2$ is at a logic 1 level, periods 09—012 during the period outputs $T_3$ is at a logic 1 level, etc. By changing the logic level of outputs $T_1$—$T_8$ during the delay period when the four outputs $P_1$—$P_4$ of the ring counter are at a logic 0 level, the possibility of any spurious spikes being produced from the gate 40, or the other similar gates represented by gate 40 which may be used to identify one of the 32 periods, is eliminated.

Although a preferred embodiment of the invention has been described in detail, it is to be understood that various changes, substitutions and alterations can be made therein without departing from the spirit and scope of the invention as defined by the appended claims.

I claim:

1. The clocking system comprising a first counter having a plurality of outputs for sequentially producing a pulse on each output and after a delay count when the outputs from said first counter are zero repeating the sequence, said first counter comprising a plurality of synchronous binary stages, means serially interconnecting the stages such that after the first stage complements to a logic 1 state, the succeeding stages sequentially complement, on successive clock pulses, from a logic 0 state to a logic 1 state, means connecting an output of each stage to an input of each stage for causing each stage to complement back to the logic 0 state on the first clock pulse after going to the logic 1 state, delay means connecting an output of the last stage to an input of the first for complementing the first state to the logic 1 state on the first clock pulse after the last stage goes to the logic 0 state, a second counter having a plurality of inputs and outputs for sequentially producing a pulse on each output and then repeating the sequence, delay means connecting an output of the last stage of said first counter to the clock inputs of said second counter such that the second counter is incremented after the last stage of the first counter goes to a logic 0 state and before the first stage of the first counter goes to a logic 1 state during the delay count of the first counter when the outputs from said first counter are 0 whereby any one of the outputs of the first counter may be ANDed with any output of the second counter so that any one of a total number of sequential periods equal to the product of the number of outputs of the first counter and the number of outputs of the second counter can be specifically identified without spurious spikes being produced in said total number of sequential periods.

2. The clocking system defined in claim 1 wherein the second counter is comprised of a plurality of synchronous binary stages, means serially interconnecting the binary stages such that after the first complements to the logic 1 state, the remaining stages sequentially complement to the logic 1 state on successive clock pulses, and means interconnecting the outputs of the last stage to the inputs of the first stage for causing the first stage to complement to the logic 0 state on the next clock pulse after the last stage goes to the logic 1 state and to complement to the logic 1 state on the next clock pulse after the last stage goes to the logic 0 state, and logic gate means connected to the outputs of the binary stages of the second counter including a number of outputs equal to twice the number of binary stages of the second counter for sequentially producing a logic 1 level on each output on successive clock pulses to the second counter and repeating the sequence.